(12) United States Patent
Wolber et al.

(10) Patent No.: US 6,585,167 B2
(45) Date of Patent: Jul. 1, 2003

(54) THERMOSTATIC VALVE

(75) Inventors: Helmut Wolber, Oberwolfach (DE); Stephan Gruhler, Trossingen (DE); Franz Wanner, Neuried (DE); Werner Lorch, Schramberg (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 09/954,321

(22) Filed: Sep. 17, 2001

(65) Prior Publication Data

US 2002/0066794 A1 Jun. 6, 2002

(30) Foreign Application Priority Data

Sep. 15, 2000 (DE) .......................................... 100 45 595

(51) Int. Cl.[7] .............................................. G05D 23/13
(52) U.S. Cl. ..................................... 236/12.2; 236/34.5
(58) Field of Search .............................. 236/12.2, 34.5

(56) References Cited

U.S. PATENT DOCUMENTS

| 3,228,603 A | * | 1/1966 | Norman ...................... 236/12.2 |
| 3,765,604 A | * | 10/1973 | Trubert et al. .............. 236/12.2 |
| 3,929,283 A | | 12/1975 | Delpla |
| 5,025,983 A | * | 6/1991 | Akita ........................ 236/12.2 |
| 5,356,074 A | * | 10/1994 | Limet et al. ................ 236/12.2 |
| 5,370,305 A | * | 12/1994 | Schneider ................... 236/12.2 |
| 5,779,139 A | * | 7/1998 | Ueno ......................... 236/12.2 |
| 5,979,777 A | * | 11/1999 | Ems .......................... 236/12.2 |
| 6,079,625 A | | 6/2000 | Lebkuchner |

FOREIGN PATENT DOCUMENTS

| DE | 25 48 650 | 10/1975 |
| DE | 34 32 730 A1 | 3/1986 |
| DE | 44 23 240 C1 | 7/1994 |
| DE | 43 24 547 A1 | 11/1994 |
| EP | 156 122 A1 | 1/1985 |
| GB | 22 42 725 A | 10/1991 |

* cited by examiner

Primary Examiner—William C. Doerrler
Assistant Examiner—Mohammad M. Ali
(74) Attorney, Agent, or Firm—Duane Morris, LLP

(57) ABSTRACT

A thermostatic valve contains a hollow cylindrical valve element, each of whose two ends form an inlet port for hot or cold water. The mixed water formed by mixing hot and cold water strikes a temperature sensor which, as a function of the temperature, displaces the valve element to a greater or lesser extent.

Within the valve element is located a mixing device, which divides the inflowing hot water into several flows, namely two radially directed flows and an axial flow flowing round the end of a sleeve. The radial parts of the hot water flow are encountered by an axial cold water flow. This leads to a particularly intimate mixing of hot and cold water before the temperature sensor is reached.

14 Claims, 1 Drawing Sheet

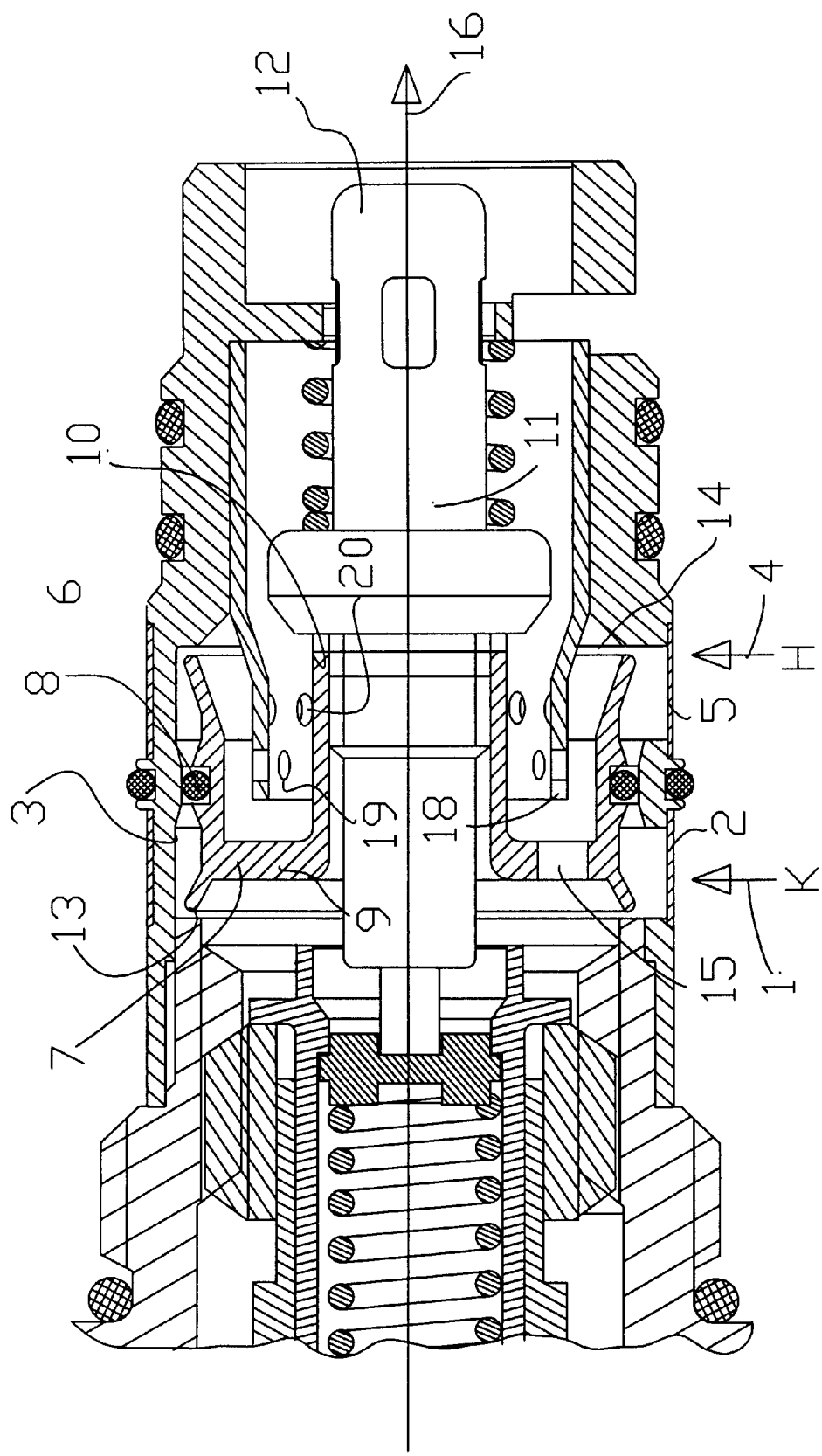

THERMOSTATIC VALVE

The invention is based on a thermostatic valve with the aid of which mixed water can be discharged at a regulated temperature from a sanitary fitting. Such thermostatic valves conventionally have a temperature-sensitive regulating element, which moves axially a valve element as a function of the mixed water temperature. The valve element is constructed as a hollow cylinder. Between its axial end faces and a casing part are formed annular slots through which flow the hot and cold water. On displacing the valve element one slot becomes larger and simultaneously the other smaller. The two water flows are then mixed, so that the regulating element is exposed to the mixed water temperature.

Such a thermostatic valve is already known (DE 4423240). In this case the valve element is so positioned that the cold water flows through it. At the rear end of the valve element in the flow direction, i.e. in the vicinity of the slot for the hot water, is provided a solid plate positioned transversely to the flow direction. It forms a cross-sectional reduction for the cold water. As a result there is a strong vorticity or turbulence of the cold water and consequently a good, thorough mixing with the hot water. The aim is for the stretching material element to reliably respond to the actual mixed water temperature, but this is gained at the expense of a cross-sectional reduction.

A thermostatic mixing battery is also known (DE 2548650), in which the hot and cold water flow in axially and in opposite directions into the hollow cylindrical valve element and leave the latter roughly centrally. Here again at the end of one flow is provided a plate, which leads to a cross-sectional reduction.

The problem of the invention is to provide a thermostatic valve, in which a good mixing of the cold and hot water is obtained before reaching the temperature sensor and which is also built up with a limited pressure loss.

For solving this problem the invention proposes a thermostatic valve having a casing with an inlet for cold water, an inlet for hot water and an outlet for mixed water, a temperature sensor, which is exposed to the mixed water temperature, a valve element, which is movable by the temperature sensor as a function of the mixed water temperature for the oppositely directed opening or closing of two inlet ports, as well as with a mixing device for mixing the hot and cold water before reaching the temperature sensor, which is constructed in such a way that it at least partly radially deflects the flow of hot or cold water, in which the deflected flow strikes an axial flow of hot or cold water. Further developments of the invention form the subject matter of the appended claims, whose wording, like that of the abstract, is by reference made into part of the content of the present description.

Whereas in the known solutions the flows of hot and cold water mainly axially strike one another, so that they essentially stop one another, according to the invention one flow is deflected in such a way that it at least partly acquires a radial component. This radial component then encounters an axial flow, so that the mixing is brought about in a very satisfactory manner, but there is no mutual stopping of the flows.

According to a further development of the invention, the flow is subdivided into a radial part and an axial part. This also leads to a good turbulence and therefore mixing of the water flows without a pressure loss.

According to another further development of the invention, the deflection takes place within the hollow cylindrical valve element. Thus, the inflowing water is firstly axially directed and at least part of this axial flow is radially deflected and then strikes the second axial flow. Thus, mixing takes place at a point which is still clearly distanced from the temperature sensor.

According to the invention, for bringing about the desired mixing, the mixing device has a sleeve, which is provided with a free end around which the flow forms. As a result of the sleeve there is substantially no cross-sectional reduction.

According to a further development of the invention, in the vicinity of its free end, the sleeve has radial passage openings in the form of holes and/or slots through which the water can pass, so that as a result it forms the radial component.

The passage openings can in particular have a closed circumference. There can be several rows of passage openings, the number and size of said openings also being variable. It is also possible for part of the passage openings, e.g. slots, to extend to the free end of the sleeve, i.e. not to have a closed circumference.

According to the invention the mixing device can be constructed as an insert or extension of the casing.

According to yet another development of the invention, the sleeve is constructed in such a way that within the hollow cylindrical valve element the flow cross-section outside the sleeve and inside the sleeve is substantially the same. This also leads to uniform flow conditions and to a limited cross-sectional reduction.

If the sleeve is not to have the same cross-section at all points, according to the invention a cross-sectional change to the sleeve can take place gradually, i.e. no edges or steps are formed and instead there are curved or rounded transitions.

Further features, details and advantages of the invention can be gathered from the following description of a preferred embodiment of the invention and the attached drawing.

The drawing is a longitudinal section through part of a thermostatic valve.

This part shown in the drawing is screwed into a fitting casing. This fitting casing provides water passages for the cold water supply pipe, for the hot water supply pipe and for the mixed water drainage pipe. These details are not shown, because they can differ between individual fitting casings and do not form part of the essence of the invention. The cold water passes in the direction of the arrow 1 through a screen or sieve 2 into an annular space 3. In the direction of the arrow 4, the hot water also passes through a screen or sieve 5 into a second annular space 6. The two annular spaces 3, 6 form part of an inner area in which a valve element 7 is positioned in axially displaceable manner. The valve element 7 is constructed as a hollow cylinder and separates the two annular spaces 3, 6 from one another by means of a seal 8. The valve element is connected by radial webs 9 to a boss 10, which is connected with the aid of a thread to the expansion element 11. The expansion element 11 contains in a cylindrical body 12 a stretching material element, which is exposed to the mixed water temperature and as a function of said mixed water temperature axially displaces the valve element 7 to a greater or lesser extent.

In the vicinity of its front end, positioned to the left in the drawing, the valve element 7 forms with a casing part a circular slot-like inlet port 13. In the vicinity of its opposite end the valve element 7 also forms with a casing part a circular slot-like inlet port 14 for the hot water. On displacing the valve element 7, the size of one inlet port is decreased and that of the other inlet port increased.

The cold water flows out of the annular space 3 through the inlet port 13 and then through the axial openings 15 of the valve element 7 in axial direction towards the outlet, which is represented by the arrow 16.

A sleeve 17 is arranged around the expansion element 11. The sleeve 17 engages on the wall of the cylindrical area in which the expansion element 11 is located. In the direction of its free end 18, located to the left in the drawing, the diameter of the sleeve 17 decreases over a frustum-shaped part. The region of the free end 18 of the sleeve also has a cylindrical construction. The free end 18 forms an edge, which in the axial direction is positioned roughly centrally between the two inlet ports 13, 14. In the vicinity of the free end 18 the sleeve 17 contains two rows of passage openings 19, 20, the passage openings 20 of the second row being centrally staggered compared with the passage openings 19 of the first row. The hot water entering the annular space 6 is initially deflected through the inlet port 14 into the interior of the hollow cylindrical valve element 7 and initially flows axially. Then a first part of this water passes through the second row of passage openings 20 radially into the interior of the mixing device which, in the embodiment shown, is formed by the sleeve 17. A second part of the inflowing hot water then passes through the first row of passage openings 19, once again radially into the interior of the sleeve 17. A third part of the hot water passes round the edge at the end of the sleeve 18 into the inner area of said sleeve.

The cold water flows axially through the opening 15 into the sleeve 17 and there laterally strikes the radially entering hot water. Thus, there is a strong turbulence and good mixing of the water, so that the mixed water in completely mixed form impacts on the temperature sensor 12. Through the use of a cylindrical sleeve 17 there is no reduction to the flow cross-section, so that the thermostatic valve operates with a low pressure loss.

What is claimed is:

1. A thermostatic valve having a casing with an inlet for cold water, an inlet for hot water and an outlet for mixed water, a temperature sensor which is exposed to the mixed water and responsive to a mixed water temperature, a valve element which is movable by the temperature sensor as a function of the mixed water temperature for oppositely directed opening or closing of two inlet ports whereof one of the ports controls a flow of hot water and another of the ports controls a flow of cold water, and further comprising a mixing device for mixing the flows of said hot and cold water before reaching the temperature sensor, wherein the mixing device divides at least one of said flows into a radial part and an axial part by deflecting part of said at least one of said flows, and wherein the flows mix by striking one another partly radially and partly axially.

2. The thermostatic valve according to claim 1, wherein one of said flows is directed axially at the mixing device and the other of said flows is directed partly radially and partly axially.

3. The thermostatic valve according to claim 1, wherein said deflecting takes place within a hollow cylindrical element.

4. The thermostatic valve according to claim 1, wherein the valve element comprises a hollow cylindrical part movable by the temperature sensor to adjust openings on opposite axial ends of a hollow cylindrical valve element, and further comprising a sleeve around whose free end there is a flow.

5. The thermostatic valve according to claim 1, wherein the mixing device is constructed as an insert of the casing.

6. The thermostatic valve according claim 4, wherein the sleeve is constructed in such a way that within the hollow cylindrical valve element flow cross-sections outside the sleeve and inside the sleeve are substantially the same.

7. The thermostatic valve according to claim 4, wherein the sleeve is constructed in such a way that within the hollow cylindrical valve element the flow cross-section inside the sleeve is larger than that outside the sleeve.

8. The thermostatic valve according to claim 4, wherein the sleeve defines a gradual change in a cross-section.

9. A thermostatic valve having a casing with an inlet for cold water, an inlet for hot water and an outlet for mixed water, a temperature sensor which is exposed to the mixed water temperature, a valve element which is movable by the temperature sensor as a function of the mixed water temperature for the oppositely directed opening or closing of two inlet ports, and a mixing device for mixing the hot and cold water before reaching the temperature sensor, wherein the mixing device comprises a sleeve with a free end, and in a vicinity of the free end, the sleeve has radial passages through which radial flow from at least one of the hot and cold water meets axial flow for said mixing.

10. The thermostatic valve according to claim 9, wherein the passages in the sleeve include openings with a closed circumference.

11. The thermostatic valve according to claim 9, wherein the passages in the sleeve include openings that open at the free end of the sleeve.

12. The thermostatic valve according to claim 9, wherein the passages in the sleeve include at least one of holes and slots.

13. The thermostatic valve according to claim 12, wherein at least some of the passages in the sleeve are closed passages.

14. The thermostatic valve according to claim 12, wherein at least some of the passages in the sleeve open at the free end of the sleeve.

* * * * *